United States Patent
Balan et al.

(10) Patent No.: US 12,466,929 B2
(45) Date of Patent: Nov. 11, 2025

(54) IONOMERS OF COPOLYMERS OF VINYLIDENE AROMATIC MONOMER AND UNSATURATED COMPOUNDS WITH ACID GROUPS

(71) Applicant: TRINSEO EUROPE GMBH, Horgen (CH)

(72) Inventors: Abidin Balan, Breda (NL); Gilbert Bouquet, Ghent (BE); Claude T.E. Van Nuffel, Oostakker (BE)

(73) Assignee: TRINSEO EUROPE GMBH, Pfaeffikon (CH)

( * ) Notice: Subject to any disclaimer, the term of this patent is extended or adjusted under 35 U.S.C. 154(b) by 1113 days.

(21) Appl. No.: 17/297,065

(22) PCT Filed: Dec. 3, 2019

(86) PCT No.: PCT/EP2019/083440
§ 371 (c)(1),
(2) Date: May 26, 2021

(87) PCT Pub. No.: WO2020/115023
PCT Pub. Date: Jun. 11, 2020

(65) Prior Publication Data
US 2022/0056177 A1      Feb. 24, 2022

Related U.S. Application Data

(60) Provisional application No. 62/774,510, filed on Dec. 3, 2018.

(51) Int. Cl.
C08F 212/08      (2006.01)
C08F 220/06      (2006.01)
(Continued)

(52) U.S. Cl.
CPC ............ C08J 9/08 (2013.01); C08F 212/08 (2013.01); C08F 220/06 (2013.01);
(Continued)

(58) Field of Classification Search
None
See application file for complete search history.

(56) References Cited

U.S. PATENT DOCUMENTS 3,322,734 A      5/1967   Rees et al.
4,454,086 A      6/1984   Corbett et al.
(Continued)

FOREIGN PATENT DOCUMENTS

CN      1184102 A      6/1998
CN      1612916 A      5/2005
(Continued)

OTHER PUBLICATIONS

Melt Flow Index, Wikipedia (https://en.wikipedia.org/wiki/Melt_flow_index), accessed Dec. 2024.*
(Continued)

*Primary Examiner* — Eli D. Strah
(74) *Attorney, Agent, or Firm* — Young Basile Hanlon & MacFarlane, P.C.

(57) ABSTRACT

Disclosed are ionomers of co-polymers of vinylidene substituted aromatic monomers and unsaturated compounds containing acid groups crosslinked by the residue of one or more metal salts and/or metal oxides of a metal having a valence of 2 or greater. The crosslinks are reversible and the weight average molecular weight of the copolymer of one or more vinylidene aromatic monomers and one or more unsaturated acids may be substantially the same after the crosslinking is reversed as it is before crosslinking. A portion of the chains of the copolymer of one or more vinylidene aromatic monomers and one or more unsaturated acids are (Continued)

crosslinked with other chains of the copolymer of one or more vinylidene aromatic monomers and one or more unsaturated acids. Disclosed are methods of preparing such ionomers.

20 Claims, 6 Drawing Sheets

(51) Int. Cl.
    *C08J 9/00*     (2006.01)
    *C08J 9/08*     (2006.01)
    *C08J 9/12*     (2006.01)
    *C08L 25/14*     (2006.01)

(52) U.S. Cl.
    CPC ............ *C08J 9/0061* (2013.01); *C08J 9/122* (2013.01); *C08L 25/14* (2013.01); *C08F 2810/20* (2013.01); *C08J 2201/03* (2013.01); *C08J 2203/02* (2013.01); *C08J 2203/06* (2013.01); *C08J 2203/184* (2013.01); *C08L 2203/14* (2013.01); *C08L 2205/025* (2013.01); *C08L 2312/00* (2013.01)

(56) References Cited

U.S. PATENT DOCUMENTS

| | | | |
|---|---|---|---|
| 4,636,527 A | 1/1987 | Suh et al. | |
| 5,670,552 A | 9/1997 | Gusavage et al. | |
| 5,844,025 A | 12/1998 | Cunkle et al. | |
| 6,613,824 B2 | 9/2003 | Campbell et al. | |
| 8,314,193 B2 | 11/2012 | Reimers et al. | |
| 8,648,148 B2 | 2/2014 | Shields et al. | |
| 8,829,114 B2 | 9/2014 | Gray et al. | |
| 2006/0167149 A1* | 7/2006 | Reimers | C08F 212/08 526/317.1 |
| 2009/0275716 A1 | 11/2009 | Reimers et al. | |
| 2010/0162826 A1* | 7/2010 | Khabashesku | C08F 212/08 526/329.2 |
| 2015/0368422 A1* | 12/2015 | Gawryla | C08J 9/0095 521/97 |

FOREIGN PATENT DOCUMENTS

| | | | | |
|---|---|---|---|---|
| CN | 101107278 A | 1/2008 | | |
| CN | 101287793 A | 10/2008 | | |
| CN | 102803360 A | 11/2012 | | |
| CN | 103958551 A | 7/2014 | | |
| EP | 2267065 A1 | 12/2010 | | |
| EP | 1937773 B1 * | 6/2012 | ............ | C08F 279/02 |
| JP | H08-143607 A | 6/1996 | | |
| TW | 200643051 A | 12/2006 | | |
| WO | 2012/078332 A1 | 6/2012 | | |
| WO | 2012/109130 A1 | 8/2012 | | |
| WO | 2018/141489 A1 | 8/2018 | | |

OTHER PUBLICATIONS

Search Report issued in co-pending Taiwan Patent Application No. 108143012 dated Feb. 2, 2023 with English translation (2 pages).
International Search Report and Written Opinion received for PCT Patent Application No. PCT/EP2019/083440, mailed on Mar. 3, 2020, 14 pages.
International Preliminary Report on Patentability received for PCT Patent Application No. PCT/EP2019/083440, mailed on Apr. 20, 2020, 15 pages.
Notification of the First Office Action in co-pending application CN201980079657.2 dated Nov. 24, 2022 with English translation (62 pages).

* cited by examiner

IONOMERS OF COPOLYMERS OF VINYLIDENE AROMATIC MONOMER AND UNSATURATED COMPOUNDS WITH ACID GROUPS

CROSS-REFERENCE TO RELATED APPLICATION(S)

This application is a 371 application of International Application No. PCT/EP2019/083440, filed on Dec. 3, 2019, which claims priority from U.S. Provisional Application No. 62/774,510, filed Dec. 3, 2018, the entire disclosure of which is hereby incorporated by reference.

TECHNICAL FIELD

This disclosure relates to ionomers of co-polymers of vinylidene substituted aromatic monomers and unsaturated compounds containing acid groups. Disclosed are compositions of co-polymers of vinylidene substituted aromatic monomers and unsaturated compounds containing acid groups and one or more metal salts and/or metal oxides of a metal having a valence of 2 or greater that when contacted form ionomers. Disclosed are methods of preparing such ionomers.

BACKGROUND

Polymers prepared from vinylidene substituted aromatic monomers, such as styrene, find uses in a number of polymeric systems, including foams, packaging (food packaging), medical, electronic, optical, appliance and automotive applications. In certain applications, such as extruded foams from vinylidene substituted aromatic monomers, high melt strength and melt elongation are desired. High melt strength and melt elongation facilitates enhanced processing of extruded foams and foams with optimized density, compressive strength and thermal conductivity. Crosslinked polymers prepared from vinylidene substituted aromatic monomers provide the desired high melt strength and melt elongation. The problem is that crosslinked polymers prepared from vinylidene substituted aromatic monomers may present problems with processing. U.S. Pat. Nos. 8,314,193; 3,322,734; and JP 08143607 disclose ionically modifying styrenic polymers containing acid groups. These references disclose permanently modifying the polymers or forming different types of links in the modified polymers.

Thus there is a need for polymers containing vinylidene substituted aromatic monomers which exhibit optimized melt strength and melt elongation which have enhanced processability and for processes to prepare such polymers. What is needed is such polymers that can be returned to substantially their original state under processing conditions.

SUMMARY

Disclosed are compositions comprising a plurality of chains of one or more copolymers of one or more vinylidene aromatic monomers and one or more unsaturated acids, the copolymers having about 0.01 to about 15.0 percent by weight of the one or more unsaturated acids wherein the acid groups are pendant from the copolymer; and a portion of the chains of the copolymer of one or more vinylidene aromatic monomers and one or more unsaturated acids are crosslinked with other chains of the copolymer of one or more vinylidene aromatic monomers and one or more unsaturated acids by i) ionic bonding of anions formed from the pendant acid groups with a metal cation having a valence of 2 or greater or ii) by complexation between pendant acid groups and metal oxides. The crosslinks are reversible and the weight average molecular weight of the copolymer of one or more vinylidene aromatic monomers and one or more unsaturated acids may be substantially the same after the crosslinking is reversed as it is before crosslinking. The metal may be one or more of transition metals, post transition metals, metalloids or an alkaline earth metals. The equivalents ratio of metal ions to equivalents of anions formed from pendant acid groups on the copolymer may be from about 40:1 to about 1:40. The one or more unsaturated acids may comprise acrylic acid, methacrylic acid, 4-vinyl benzoic acid, maleic acid, fumaric acid, 4-styrene sulfonic acid or mixtures thereof. The copolymer of the one or more vinylidene aromatic monomers and one or more unsaturated acids may contain one or more of (meth)acrylates, unsaturated nitriles and conjugated dienes. The crosslinked composition may contain one or more polymers or copolymers of one or more vinylidene aromatic mono-mers blended with the copolymer of one or more vinylidene aromatic monomers and one or more unsaturated acids. The copolymers of one or more vinylidene aromatic monomers may contain one or more of (meth)acrylates, unsaturated nitriles and conjugated dienes.

The crosslinked composition may comprise one or more impact modifiers, which may be materials commonly referred to as rubbers. The composition may comprise from about 50 to about 99.5 percent by weight of the crosslinked copolymer, or composition containing the crosslinked copolymer, and from about 0.5 to about 50 percent by weight of the impact modifier based on the weight of the composition. The composition may comprise a continuous matrix of the copolymer, or composition containing the crosslinked copolymer, and a dispersed phase comprising rubber. The dispersed phase may comprise particles of about 0.05 to about 25.0 microns. The impact modifier may be grafted to the copolymers described herein. The copolymers may be grafted to the impact modifier. The impact modifier that may be grafted to the copolymer or that the copolymer is grafted to may be polybutadiene.

Disclosed is a composition comprising: a) in one part a plurality of chains of a copolymer of one or more vinylidene aromatic monomers and one or more unsaturated acids, the copolymer having about 0.01 to about 15.0 percent by weight of the one or more unsaturated acids wherein the acid groups are pendant from the copolymer; and b) in a separate part one or more metal salts and/or metal oxides of a metal having a valence of 2 or greater. The equivalents ratio of metal salts or metal oxides to equivalents of pendant acid groups on the copolymer may be from about 40:1 to about 1:40. The metal may be one or more of transition metals, post transition metals, metalloids, alkaline earth metals or mixtures thereof. The metal may be present as a metal carbonate, metal acetate, metal bicarbonate, metal oxide, metal hydroxide, metal carboxylate, metal acetylacetonate, metal salt of a fatty acid, or mixtures thereof. At least two of the valences of the metals are capable of ionic bonding of anions formed from the pendant acid groups with a metal cation having a valence of 2 or greater or ii) forming complexes between pendant acid groups and metal oxides.

Disclosed is a method for preparing the crosslinked copolymers comprising: contacting one or more copolymers of one or more vinylidene aromatic monomers and one or more unsaturated acids acid groups pendant from the copolymer with one or more metal salts of a metal having a valence of 2 or greater under conditions such that a portion of the chains of the copolymer of one or more vinylidene aromatic monomers and one or more unsaturated acids are crosslinked with other chains of the copolymer of one or more vinylidene aromatic monomers and one or more unsaturated acids by ionic bonding of anions formed from the pendant acid groups with metal cations formed from the metal salts or complexing of the pendant acid groups with metal oxides. The contacting may take place at a temperature of about 180° C. to about 260° C. for a time period of about 0.5 to about 5 minutes wherein the copolymer of one or more vinylidene aromatic monomers and one or more unsaturated acids are crosslinked with other chains of the copolymer of one or more vinylidene aromatic monomers and one or more unsaturated carboxylic acids. The equivalents ratio of metal salts or oxides to equivalents of pendant acid groups on the copolymer may be from about 40:1 to about 1:40.

Disclosed is a method comprising subjecting the crosslinked copolymers disclosed to a temperature of about 180° C. to about 240° C. under shear and/or contacting the composition with excess equivalents of an acid with respect to the crosslinked anions such that the crosslinks are reversed. The acid contacted with the crosslinked copolymer of one or more vinylidene aromatic monomers and one or more unsaturated acids is acetic acid, a carboxylic acid corresponding to the formula CH3(CH2)nCOOH wherein n is separately in each occurrence from 1 to 20, triflouro acetic acid, or mixtures thereof.

The melt viscosity at $0.314\ s^{-1}$ angular frequency of the crosslinked polymers may be at least 10 percent higher than the same polymer without crosslinking when measured at 200° C. The viscosity of the crosslinked copolymer of one or more vinylidene aromatic monomers and one or more unsaturated acids may be at least 100 percent greater than the viscosity of the uncrosslinked copolymers. The crosslinked copolymer of one or more vinylidene aromatic monomers and one or more unsaturated acids may have a melt flow rate at least 10% lower after crosslinking compared to non-crosslinked polymer. The copolymer without crosslinking may have a Mz of from about 200 kg/mole to about 800 kg/mole or from about 100 kg/mole to about 400 kg/mole. The crosslinked copolymers may be used to prepare extruded foams, extruded sheets, blow-molded parts, injection molded parts, thermoformed parts, and the like.

DETAILED DESCRIPTION

Figure 1:
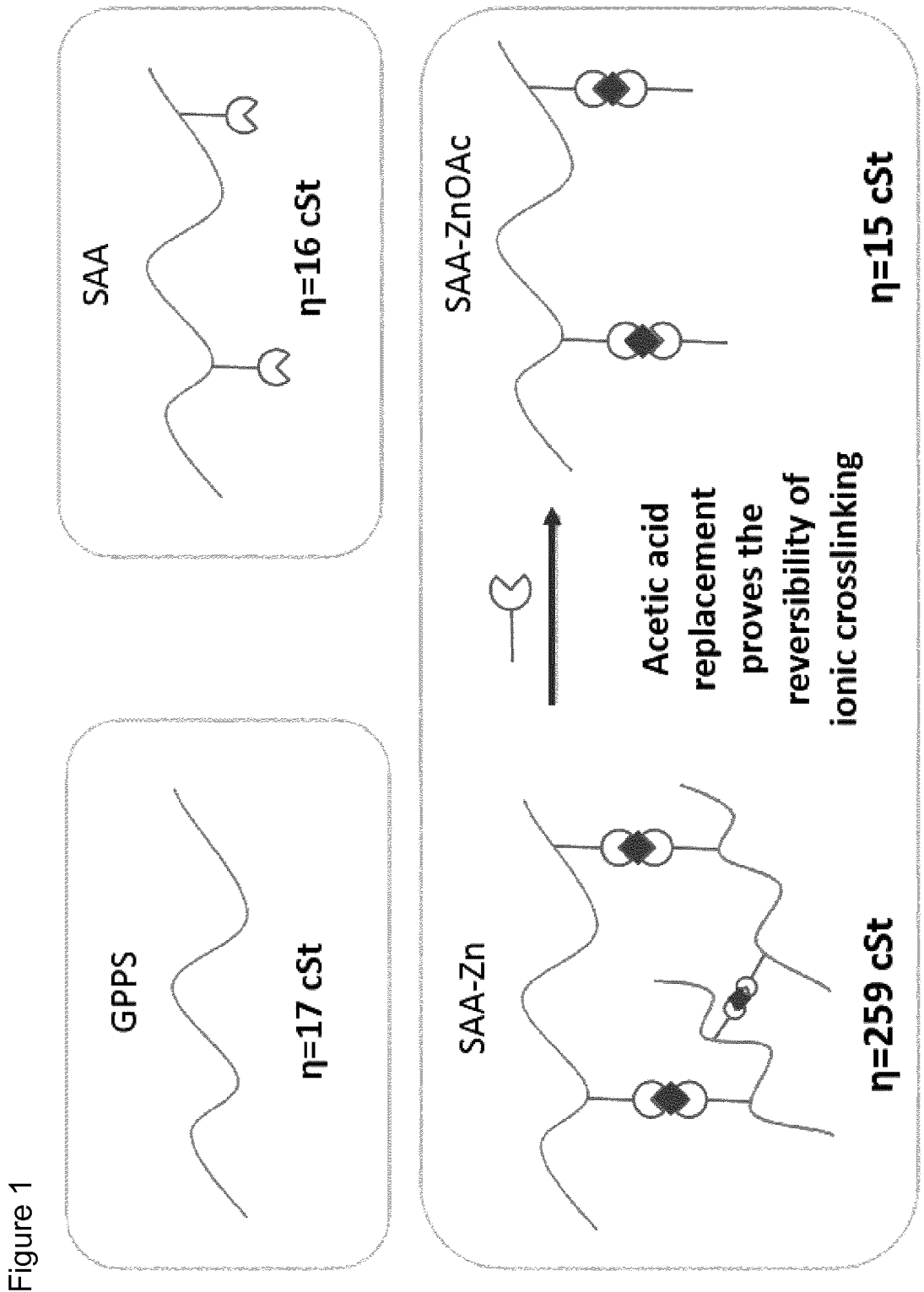
FIG. 1 shows ionic crosslinking and reversing the crosslinks.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

One or more as used herein means that at least one, or more than one, of the recited components may be used as disclosed. Hydrocarbyl as used herein refers to a group containing one or more carbon atom backbones and hydrogen atoms, which may optionally contain one or more heteroatoms. Where the hydrocarbyl group contains heteroatoms, the heteroatoms may form one or more functional groups well known to one skilled in the art. Hydrocarbyl groups may contain cycloaliphatic, aliphatic, aromatic or any combination of such segments. The aliphatic segments can be straight or branched. The aliphatic and cycloaliphatic segments may include one or more double and/or triple bonds. Included in hydrocarbyl groups are alkyl, alkenyl, alkynyl, aryl, cycloalkyl, cycloalkenyl, alkaryl and aralkyl groups. Cycloaliphatic groups may contain both cyclic portions and noncyclic portions. Hydrocarbylene means a hydrocarbyl group or any of the described subsets having more than one valence, such as alkylene, alkenylene, alkynylene, arylene, cycloalkylene, cycloalkenylene, alkarylene and aralkylene. As used herein percent by weight or parts by weight refer to, or are based on, the weight of the compositions unless otherwise specified. Pendant from the copolymer means that the group referred to is pendant from the polymer chains of the copolymer. Pendant from the copolymer may mean the groups referred to are disposed along the polymer chains and are pendant therefrom and may not be located at the terminal ends of the copolymer chains.

Crosslinked as used herein means that a plurality of the subject copolymers are linked to other subject copolymers through ionic bonds of anions formed from the acid groups from the unsaturated acid with cations formed from the metals or by complexes of from the acid groups from the unsaturated acid with metal oxides wherein the metal salts and metal oxides that have at least two valences. Valence with respect to the metals mean that the metals can form two cationic species that form bonds with anions or can complex with at least two acids. The subject copolymers may be one or more copolymers of one or more vinylidene aromatic monomers and one or more unsaturated compounds containing an acid group. A number of the subject copolymers may have two or more bonds to other subject copolymers. The number of the subject copolymers may have two or more bonds to other subject copolymers and overall crosslinks are chosen to provide the advantageous properties of the crosslinked polymers disclosed herein. As used herein un-crosslinked means that the subject polymers do not have multiple crosslinks such that the resulting polymer composition becomes insoluble in solvents, such as methylene chloride at 23° C.

The polymers which are crosslinked are based on one or more copolymers of one or more vinylidene aromatic monomers and one or more unsaturated compounds containing one or more acid groups. The copolymers of one or more copolymers of one or more vinylidene aromatic monomers and one or more unsaturated compounds containing one or more acid groups are addition polymers formed by addition polymerization through unsaturated groups. The copolymers are prepared such that the concentration of acid groups is selected such that when reacted with one or more metal salts or metal oxides the copolymers are crosslinked to provide the advantageous properties described herein.

The concentration of the acid groups on the one or more copolymers of one or more vinylidene aromatic monomers and one or more unsaturated compounds containing a an acid group is chosen such that based on the concentration of metal salts or metal oxides which are to be reacted with the copolymers crosslinked polymers are prepared. The concentration of the acid groups on the one or more copolymers of one or more vinylidene aromatic monomers and one or more unsaturated compounds containing acid groups may be about 0.01 percent by weight of the copolymer or greater, about 0.05 percent by weight or greater or about 0.2 percent by weight or greater. The concentration of the acid groups on the one or more copolymers of one or more vinylidene aromatic monomers and one or more unsaturated compounds containing acid groups may be about 15 percent by weight of the copolymer or less, about 10 percent by weight or less or about 5 percent by weight or less.

The equivalents ratio of metal salts to the acid groups on the copolymers of one or more vinylidene aromatic monomers and one or more unsaturated compounds containing acid groups is chosen such that when the components are reacted crosslinked polymers are prepared. Equivalents as used in this context means the number of acidic groups available to react with the metals. To form the crosslinked polymers anions based on the acid groups react with the cations formed from the metal salts that have valences of two or greater or the acids complex with metal oxides. The extent of reaction and crosslinking is controlled by the amount of the lowest amount of the acid groups or metal oxide or metal salts present. The amount of acidic groups may be the limiting reactive group. The amount of metal salts or metal oxides groups may be the limiting reactive group. The equivalents ratio of metal salts or metal oxides to acidic groups may be about 1:40 or greater, about 1:20 or greater or 1:10 or greater. The equivalents ratio of metal salts or metal oxides to acidic groups may be about 40:1 or less, about 20:1 or less or 10:1 or less.

The copolymers disclosed herein contain vinylidene substituted aromatic monomers. Vinylidene substituted aromatic monomers comprise vinylidene, alkenyl groups, bonded directly to aromatic structures. The vinylidene substituted aromatic monomers may contain one or more aromatic rings, may contain one or two aromatic rings, or may contain one aromatic ring. The aromatic rings can be unsubstituted or substituted with a substituent that does not interfere with polymerization of the vinylidene substituted aromatic monomers, or the fabrication of the polymers formed into desired structures. The substituents may be halogens or alkyl groups, such as bromine, chlorine or $C_1$ to $C_4$ alkyl groups; or a methyl group. Alkenyl groups comprise straight or branched carbon chains having one or more double bonds, or one double bond. The alkenyl groups useful for the vinylidene substituted aromatic monomers may include those that when bonded to an aromatic ring are capable of polymerization to form copolymers. The alkenyl groups may have 2 to 10 carbon atoms, 2 to 4 carbon atoms or 2 carbon atoms. Exemplary vinylidene substituted aromatic monomers include styrene, alpha methyl styrene, N-phenyl-maleimide and chlorinated styrenes; or alpha-methyl styrene and styrene. The vinylidene substituted aromatic monomers may be mono-vinylidene aromatic monomers, which contain one unsaturated group. Vinylidene aromatic monomers include but are not limited to those described in U.S. Pat. Nos. 4,666,987; 4,572,819 and 4,585, 825, which are incorporated herein by reference. The monomer may correspond to the formula:

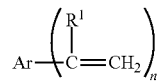

Wherein $R^1$ is separately in each occurrence hydrogen or methyl; and

Ar is separately in each occurrence an aromatic group. Ar may contain one or more aromatic rings, may contain one or two aromatic rings, or may contain one aromatic ring. n is separately in each occurrence 1 to 3, 1 to 2 or 1. The aromatic rings can be unsubstituted or substituted with a substituent that does not interfere with polymerization of the vinylidene substituted aromatic monomers, or the fabrication of the polymers formed into desired structures. The substituents may be halogens or alkyl groups, such as bromine, chlorine or $C_1$ to $C_4$ alkyl groups; or a methyl group. The vinylidene substituted aromatic monomers may be present in the copolymers in a sufficient amount such that the polymer exhibits the advantageous properties associated with polymers of vinylidene substituted aromatic monomers, for instance polystyrene. Among the advantageous properties of polymers of vinylidene substituted monomers include processability, stiffness, and thermal stability. The copolymers of one or more vinylidene aromatic monomers and one or more unsaturated compounds containing an acid group may contain vinylidene substituted aromatic monomers in an amount of about 85 percent by weight of the copolymers or greater, about 90 percent by weight or greater or about 95 percent by weight or greater. The copolymers of one or more vinylidene aromatic monomers and one or more unsaturated compounds containing an acid group may contain vinylidene substituted aromatic monomers in an amount of about 99.99 percent by weight of the polymerizable compositions or copolymers or less, about 99.97 percent by weight or less or about 99.95 percent by weight or less.

The compositions may contain branching agents commonly used in vinylidene aromatic based polymers. The branching agents may be vinylidene substituted aromatic monomers having 2 or more vinylidene groups. Other branching agents may include other bifunctional and in general multifunctional (functionality >2) monomers, multifunctional initiators and multifunctional chain transfer agents and the like. The branching agents may be present in the polymerizable compositions in an amount of about 0.001 percent by weight of the composition or greater, about 0.002 percent by weight or greater or about 0.003 percent by weight or greater. The branching agents may be present in the polymerizable compositions in an amount of about 0.5 percent by weight of the composition or less, about 0.2 percent by weight or less or about 0.1 percent by weight or less.

The one or more unsaturated compounds containing acid groups may contain any acid group that can form an anion that is capable of reacting with a cation formed from a metal salt or metal oxide to form a crosslink between copolymer chains. Exemplary acid groups include carboxylic acids, unsaturated aromatic acids, sulfonic acids, phosphorous based acids, boronic acids, and the like. The sulfonic acids may be aromatic sulfonic acids. Exemplary acids include acrylic acid, methacrylic acid, 4-vinyl benzoic acid, maleic acid, fumaric acid, 4-styrene sulfonic acid, or mixtures thereof.

The copolymers disclosed herein may further comprise one or more (meth)acrylates. (Meth)acrylate as used herein refers to compounds having a vinyl group bonded to the carbonyl moiety of an alkyl ester wherein the carbon of the vinyl group bonded to the carbonyl group further has a hydrogen or a methyl group bonded thereto. The term (meth) as used in this context refers to compounds having either of a hydrogen or methyl group on the carbon of the vinyl group bonded to the carbonyl group. (Meth)acrylates useful include those that correspond to the formula:

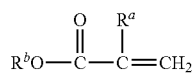

wherein $R^a$ is separately in each occurrence H or —$CH_3$; and $R^b$ may be a $C_1$ to $C_{-30}$ alkyl group or $C_{1-10}$ alkyl group. Examples of the one or more (meth)acrylates include lower alkyl (meth)acrylates, such as methyl (meth) acrylate, ethyl (meth)acrylate, propyl (meth)acrylate, butyl (meth)acrylate, pentyl(meth)(acrylate) and hexyl (meth) acrylate. The one or more (meth)acrylates in the polymerizable composition may be present in sufficient amount to provide the desired properties of the copolymer such as processability, practical toughness, refractive index, environmental stress crack resistance, hydrolytic stability, thermal stability, UV stability, impact resistance, weatherability, and the like. The polymerizable compositions and copolymers disclosed herein contain (meth)acrylates in an amount of about 0 percent by weight of the polymerizable compositions or copolymers or greater, about 1 percent by weight or greater or about 2 percent by weight or greater. The polymerizable compositions and copolymers disclosed herein contain (meth)acrylates in an amount of about 20 percent by weight of the polymerizable compositions or copolymers or less, about 15 percent by weight or less, about 10 percent by weight or less, about 8 percent by weight or less or about 5 percent by weight or less.

The copolymers may further comprise one or more unsaturated nitriles. Unsaturated nitriles include, acrylonitrile, methacrylonitrile, ethacrylonitrile, fumaronitrile and mixtures thereof. The unsaturated nitrile may be acrylonitrile. The unsaturated nitriles may be present to enhance the glass transition temperature, transparency, chemical resistance and the like. The copolymers disclosed contain one or more unsaturated nitriles in an amount of about 0 percent by weight of the copolymers or greater, about 1 percent by weight or greater or about 2 percent by weight or greater. The copolymers may contain one or more unsaturated nitriles in an amount of about 40 percent by weight of the copolymers or less, about 35 percent by weight or less, about 30 percent by weight or less or about 20 percent by weight or less.

Other vinyl monomers may be included in the copolymers, in sufficient amount to provide the desired properties as disclosed herein, including conjugated 1,3 dienes (for example butadiene, isoprene, etc.); alpha- or beta-unsaturated monobasic acids and derivatives thereof (for example, acrylic acid, methacrylic acid, etc.); vinyl halides such as vinyl chloride, vinyl bromide; vinylidene chloride, vinylidene bromide; vinyl esters such as vinyl acetate, vinyl propionate, etc.; ethylenically unsaturated dicarboxylic acids and anhydrides and derivatives thereof, such as maleic acid, fumaric acid, maleic anhydride, dialkyl maleates or fumarates, such as dimethyl maleate, diethyl maleate, dibutyl maleate, the corresponding fumarates, N-phenyl maleimide (N-PMI); and the like. These additional comonomers can be incorporated in to the composition in several ways including, interpolymerization with the vinylidene substituted aromatic containing copolymer and/or polymerization into polymeric components that can be combined, for example blended with the copolymer. If present, the amount of such comonomers may be equal to or less than about 20 weight percent, equal to or less than about 10 weight percent or equal to about 5 weight percent based on the total weight of the polymeric composition. Such co-monomers may be present in an amount of about 1 percent by weight or greater.

The compositions disclosed may contain impact modifiers. The terms impact modifiers and rubbers are used interchangeably herein. Various impact modifiers may be used in the compositions disclosed; such as diene rubbers, ethylene propylene rubbers, ethylene propylene diene (EPDM) rubbers, ethylene copolymer rubbers, acrylate rubbers, polyisoprene rubbers, silicon rubbers, silicon-acrylate rubbers, polyurethanes, thermoplastic elastomers, halogen containing rubbers, inter-polymers of rubber-forming monomers with other copolymerizable monomers and mixtures thereof. The rubbers may be present in the formulated composition in sufficient amount to provide the desired impact properties to the composition. Desired impact properties include increased izod, charpy, gardner, tensile, falling dart, and the like. The compositions may contain impact modifiers (rubbers) in an amount of about 0.5 percent by weight of the compositions or greater, about 1 percent by weight or greater or about 2 percent by weight or greater. The compositions may contain impact modifiers (rubbers) in an amount of about 50 percent by weight of the compositions or less, about 45 percent by weight or less, about 40 percent by weight or less, about 30 percent by weight or less, about 20 percent by weight or less or about 10 percent by weight or less. The compositions may contain the copolymer in an amount of about 0.5 percent by weight of the compositions or greater. The compositions may contain copolymer in an amount of about 99.5 percent by weight of the compositions or less, 90 percent by weight of the compositions or less, 80 percent by weight of the compositions or less or 50 percent by weight of the compositions or less. Compositions as used in this context are the compositions containing all of the ingredients for the intended use.

The rubbers may be diene rubbers such as polybutadiene, polyisoprene, polypiperylene, polychloroprene, and the like or mixtures of diene rubbers, that is, any rubbery polymers of one or more conjugated 1,3-dienes, such as 1,3-butadiene. Such rubbers include homopolymers of 1,3-butadiene and copolymers of 1,3-butadiene with one or more copolymerizable monomers, such as vinylidene substituted aromatic (styrene). The diene rubber may be the homopolymer of 1,3-butadiene. Exemplary copolymers of 1,3-butadiene are block or tapered block rubbers of at least about 30 weight percent 1,3-butadiene, from about 50 weight percent, from about 70 weight percent, or from about 90 weight percent 1,3-butadiene and up to about 70 weight percent vinylidene substituted aromatic monomer, up to about 50 weight percent, up to about 30 weight percent, or up to about 10 weight percent vinylidene substituted aromatic monomer, weights based on the weight of the 1,3-butadiene copolymer.

The impact modifiers employed may be those polymers and copolymers which exhibit a second order transition temperature, sometimes referred to as the glass transition temperature (Tg), for the diene fragment which is not higher than 0° C. or not higher than −20° C. as determined using conventional techniques, for example ASTM Test Method D 746-52 T. Tg is the temperature or temperature range at which a polymeric material shows an abrupt change in its physical properties, including, for example, mechanical strength. Tg can be determined by differential scanning calorimetry (DSC). The diene rubber may have a weight average molecular weight of at least about 100 kilogram per mole (kg/mole) or a weight average molecular weight of at least about a 300 kg/mole. The diene rubber may have a weight-average molecular weight equal to or less than about 900 kg/mole or a weight average molecular weight equal to or less than 600 kg/mole. The diene rubber having a solution viscosity of at least 10 centiStokes (cSt) (10 percent (%) solution in styrene) or a solution viscosity of about 30 cSt. The diene rubber may have a solution viscosity equal to or less than about 500 cSt or equal to or less than about 400 cSt. The rubber, with graft and/or occluded polymers if present, is dispersed in the continuous matrix phase as discrete particles. The rubber particles may comprise a range of sizes having a mono-modal, bimodal, or multimodal distribution. The average particle size of a rubber particle, as used herein, will, refer to the volume average diameter. In most cases, the volume average diameter of a group of particles is the same as the weight average. The average particle diameter measurement generally includes the polymer grafted to the rubber particles and occlusions of polymer within the particles. Unless otherwise specified, the rubber particle sizes disclosed and claimed herein are determined on a Coulter Multisizer II or II e with the ACCUCOMP™ Software Version 2.01 by the following method: about 3 granules of polymer samples (30-70 mg) are dissolved in 5 milliliters (ml) of Dimethyl Formamide (DMF), using an ultrasonic bath for agitation for approximately 15 to 20 minutes. 10 ml or an electrolyte solution (1 percent of $NH_4SCN$ in DMF) is mixed with 0.2 ml of the sample solution. The coulter measuring stand is used with 20 micrometer Coulter tube and a 1.16 micrometer calibration material. The coincidence level indicator of the apparatus should read between 5 and 10 percent. If the reading is above 10 percent, dilute the sample in a beaker with electrolyte solution, or if it is too low, add more drops of the polymer solution in DMF. The volumetric mean particle size is reported. The average particle size of the rubber particles may be equal to or greater than about 0.05 micrometers (microns) (μm), equal to or greater than about 0.1 micrometers, and about 0.5 micrometers. The average particle size of the rubber particles may be equal to or less than about 10 micrometers, preferably equal to or less than about 5 micrometers, or equal to or less than about 4 micrometers.

The compositions may also optionally contain one or more additives commonly used in compositions of this type. Exemplary additives include: ignition resistant additives, stabilizers, colorants, antioxidants, antistats, silicon oils, flow enhancers, mold releases, etc. Exemplary ignition resistance additives include halogenated hydrocarbons, halogenated carbonate oligomers, halogenated diglycidyl ethers, organophosphorous compounds, fluorinated olefins, antimony oxide and metal salts of aromatic sulfur, or a mixture thereof may be used. Compounds which stabilize mass polymerized rubber-modified vinylidene substituted aromatic copolymer compositions against degradation caused by, but not limited to heat, light, and oxygen, or a mixture thereof may be used. Fillers and reinforcements may also be present. Exemplary fillers include talc, clay, wollastonite, mica, glass or a mixture thereof. If used, such additives and/or fillers may be present in the formulated compositions in an amount about 0.01 percent by weight or greater, about 0.1 percent by weight or greater, about 1 percent by weight or greater, about 2 percent by weight or greater, or about 3 percent by weight or greater based on the weight of the compositions. The additives and/or fillers may be present in an amount of about 40 percent by weight or less, about 30 percent by weight or less, about 20 percent by weight or less, about 15 percent by weight or less, about 10 percent by weight or less, about 5 percent by weight or less based on the weight of the composition. The additives may be present in amounts up to 5 weight percent while fillers may be present in amounts up to 40 weight percent based on the weight of the compositions.

Various techniques for producing the copolymers are disclosed. Examples of these known polymerization processes include bulk, mass-solution, or mass-suspension polymerization, generally known as mass polymerization processes. For a good discussion of how to make monovinylidene aromatic copolymer containing compositions see "Modern Styrenic Polymers" of Series In Polymer Science (Wiley), Ed. John Scheirs and Duane Priddy, ISBN 0 471 497525. Also, for example, U.S. Pat. Nos. 3,660,535; 3,243, 481; and 4,239,863, which are incorporated herein by reference. Continuous mass polymerization techniques are advantageously employed in preparing the copolymers. The polymerization may conducted in one or more substantially linear, stratified flow or so-called "plug-flow" type reactors such as described in U.S. Pat. No. 2,727,884, sometimes referred to as multizone plug flow bulk process, which may or may not comprise recirculation of a portion of the partially polymerized product or, alternatively, in a stirred tank reactor wherein the contents of the reactor are essentially uniform throughout, which is generally employed in combination with one or more plug-flow type reactors. The stirred tank reactors can be boiling and/or coil reactors. Such reactors can be used in series. Processes for use of the stirred tank reactors for preparing copolymers are disclosed in *Modern Styrenic Polymers*, Edited by John Schiers and Duane Priddy, Wiley, ISBN 0 471 49752 5, published in 2003, see pp 43-72, relevant portions incorporated herein by reference. Alternatively, a parallel reactor set-up, as taught in EP 412801, may also be suitable for preparing the copolymers, relevant portions are incorporated herein by reference.

Multizone plug flow bulk processes include a series of polymerization vessels (or towers), consecutively connected to each other, providing multiple reaction zones. A mixture of monomers used to prepare the copolymer is formed and then fed into the reaction system. A rubber, for example butadiene rubber may be dissolved in the mixture monomers before being fed into the reaction system. The polymerization can be thermally or chemically initiated, and viscosity of the reaction mixture will gradually increase. During the reaction course, where present, the rubber may become grafted with the copolymer and, in the rubber solution, bulk copolymer (referred to also as free copolymer or matrix copolymer or non-grafted copolymer) is also formed. At a point where the free copolymer cannot be "held" in one single, continuous "phase" of rubber solution, it begins to form domains of copolymer dissolved in monomer and solvent. The polymerization mixture now is a two-phase system. As polymerization proceeds, more and more free copolymer is formed, and the rubber phase starts to disperse itself (rubber domains) in the matrix of the ever-growing free copolymer phase. Eventually, the free copolymer becomes a continuous phase. Some copolymer is occluded inside the rubber particles as well. Pre-phase inversion means that the rubber solution is a continuous phase and that no rubber particles are formed, and post phase inversion means that substantially all of the rubber phase has converted to rubber domains and there is a continuous copolymer phase. Following the phase inversion, more matrix copolymer may be formed A feed with a functional monomer such as N-phenyl maleimide that increases the Tg of the matrix and also the heat resistance of the product can be added in one or more location throughout the polymerization process, the location(s) may be the same or different from where the co-monomers are added, for example see U.S. Pat. Nos. 5,412,036 and 5,446,103, which are incorporated herein by reference.

A feed with a functional additive such as ethylenebisstearamide, dialkyladipates, polydimethylsiloxane, or other lubricants or release agents that increases the processability of the product can be added in one or more location throughout the polymerization, devolatization and conveying process, the location(s) may be the same or different from where the co-monomers are added.

When a desirable monomer conversion level and a matrix copolymer of desired molecular weight distribution is obtained, where rubber is present, the polymerization mixture may then be subjected to conditions sufficient to crosslink the rubber and remove any unreacted monomer and solvent. Such crosslinking and removal of unreacted monomer, as well as removal of diluent or solvent, if employed, and other volatile materials is advantageously conducted employing conventional devolatilization techniques, such as introducing the polymerization mixture into a devolatilizing chamber, flashing off the monomer and other volatiles at elevated temperatures, for example, from 130° C. to 300° C. and/or under vacuum and removing them from the chamber. Thereafter the polymer may be extruded, and bulk pellets obtained from a pelletizer.

The temperatures at which polymerization is conducted are dependent on a variety of factors including the specific initiator and type and concentration of rubber, comonomers, reactor set-up, and reaction solvent, if any, employed. Polymerization temperatures from 60° C. to 160° C. may be employed prior to phase inversion with temperatures from 100° C. to 200° C. being employed subsequent to phase inversion. Mass polymerization at such elevated temperatures is continued until the desired conversion of monomers to polymer is obtained. The conversion may be (percent solids) from 55 to 90, or 60 to 85, weight percent of the monomers added to the polymerization system to polymer. Percent solids is the ratio of the weight of the solids (for example, rubber plus matrix (co)polymer) to the weight of the reaction mixture (for example, unpolymerized monomer(s)) expressed in percent at any specified time during the polymerization reaction.

A polymer's molecular weight is directly related to the entanglement effects contributing to its rheological and physical properties. The molecular weight of the matrix copolymer produced in the grafting reactor during the production of the rubber-modified vinylidene aromatic substituted copolymer can be adjusted by the addition of a suitable chain transfer agent. Chain transfer agents, or molecular weight regulators, are substances which can undergo atom or group transfer or an addition-elimination. Organic molecules with labile hydrogens and are well known, for example, alpha-methyl styrene dimer, mercaptans or thiols such as n-dodecylmercaptan (nDM) and thioglycolate, disulfides, dithiauram disulfides, monosulfides, halides or halocarbons, common solvents and certain unsaturated compounds such as allyl peroxides, allyl halides, allyl sulfides, and terpenes such as terpinoline. Also transition metal complexes as cobalt (II) porphyrin complexes can be used as transfer agent. Chain transfer agents are added in an amount from about 0.0001 to 10 weight percent based on the weight of the reaction mixture. The chain transfer agent may be added in an amount equal to or greater than about 0.001 weight percent, about 0.002, or about 0.003 weight percent based on the weight of the reaction mixture. The chain transfer agent may be added in an amount equal to or less than about 0.5 weight percent, about 0.2, or about 0.1 weight percent based on the weight of the reaction mixture. The chain transfer agent may be added all at once in one reactor zone or it may be added in two or more reactor zones. Chain transfer agent may be added before phase inversion, during rubber particle sizing, more may be added after particle sizing to help control the matrix molecular weight, and optionally more may be added later to fine tune the matrix molecular weight/molecular weight distribution. The chain transfer agent may be added at the beginning of the polymerization in a first amount equal to or greater than 0.001 weight percent, from about 0.002 and about 0.1 weight percent, or from about 0.003 and about 0.05 weight percent based on the weight of the reaction mixture. The amount of chain transfer agent added later, for example after about 40 percent solids, 30 percent solids, is added in a second amount equal to or less than about 0.7 weight percent, about 0.001 to about 0.6 weight percent, or from about 0.002 to about 0.5 weight percent based on the weight of the reaction mixture. The molecular weight of the matrix copolymer depends on, among other things, how much chain transfer agent is used and when it is added.

The monomers and optionally rubber or rubber precursors in the reaction mixture may be dissolved or dispersed in an inert solvent. Useful solvent families are aromatics, ketones, alkanes. An exemplary solvent is ethyl benzene. The solids level of monomers and rubbers or rubber precursors in the solvent may be chosen to facilitate efficient formation of the copolymer and optionally dispersed rubber in the copolymer The solids level of monomers and optionally rubber or rubber precursors in the reaction mixture is about 60 percent by weight or greater based on the reaction mixture, is about 65 percent by weight or greater or is about 70 percent by weight or greater. The solids level of monomers and optionally rubber or rubber precursors in the reaction mixture is about 95 percent by weight or less based on the reaction mixture, is about 90 percent by weight or less or is about 85 percent by weight or less.

The residence time of the reaction mixture in the reactors is sufficient to prepare copolymers having the desired molecular weight. The residence time of the reaction mixture in the reactors may be about 1 hour or greater, about 1.5 hours or greater or about 2 hours or greater. The residence time of the reaction mixture in the reactors may be about 10 hours or less, about 9 hours or less or about 8 hours or less. The molecular weight of the copolymer may be about 100 kg/mole or greater, about 120 kg/mole or greater or about 140 kg/mole or greater. The molecular weight of the copolymer may be about 400 kg/mole or less, about 350 kg/mole or less or about 325 kg/mole or less. Molecular weight is determined by gel permeation chromatography using polystyrene standards.

The process may be performed in the presence of a radical initiator. Any radical initiator that enhances the formation of the copolymers may be used. Exemplary classes of initiators include free radical initiators such as peroxide and azo compounds that accelerate the polymerization of the vinyl aromatic monomer. Exemplary initiators include but are not limited to tertiary butyl peroxyacetate, dibenzoyl peroxide, dilauroyl peroxide, t-butylhydroperoxide, ditertiary-butylperoxide, cumene hydroperoxide, dicumylperoxide, 1,1-bis(tertiary-butylperoxy)-3,3,5-trimethyl-cyclohexane, t-butylperoxybe nzoate, 1,1-bis(t-butylperoxy)-cyclohexane, benzoylperoxide, succinoylperoxide and t-butylperoxypivilate, and azo compounds such as azobisisobutyronitrile, azobis-2,4-dimethylvaleronitrile, azobiscyclohexanecarbo-nitrile, azobismethyl isolactate and azobiscyanovalerate. Typical amounts are well known in the art and may be used in the disclosed process. The radical initiators may be utilized in a sufficient amount to enhance the polymerization of the monomers to form a copolymer, including increasing the rate of polymerization. The radical initiators may be present in an amount of about 0.001 percent by weight or greater based on the weight of the monomers present, about 0.002 percent by weight or greater or about 0.003 percent by weight or greater. The radical initiators may be present in an amount of about 0.1 percent by weight or less based on the weight of the co-monomers present, about 0.08 percent by weight or less or about 0.05 percent by weight or less.

Disclosed is a composition useful for preparing crosslinked copolymers of one or more vinylidene aromatic monomers and one or more unsaturated compounds containing a acid group. The composition comprises: a) in one part a plurality of chains of a copolymer of one or more vinylidene aromatic monomers and one or more unsaturated acids, the copolymer having about 0.01 to about 15.0 percent by weight of the one or more unsaturated acids wherein the acid groups are pendant from the copolymer; and b) in a separate part one or more metal salts and/or metal oxides of a metal having a valence of 2 or greater. The two parts may be kept separate until formation of the crosslinked copolymers of one or more vinylidene aromatic monomers and one or more unsaturated compounds containing one or more acid groups is desired. The formation of the crosslinked copolymers of one or more vinylidene aromatic monomers and one or more unsaturated compounds containing one or more acid groups may take place at a time and place remote from preparation of the copolymers. The crosslinked copolymers may be formed by contacting the components. The components may be contacted under conditions disclosed herein to form the crosslinked copolymers. The separate part, b), may further comprise one or more of polymers comprising vinylidene aromatic monomers having no acid groups, flame retardants, fillers, process aids, mineral oil, nucleating agents, blowing agents, thermal stabilizers, antioxidants, colorants, UV absorbers/stabilizers, thermal attenuators or mixtures thereof.

The uncontacted composition may include one or more metal salts and/or metal oxides of a metal having a valence of 2 or greater. The metal may be any metal that is capable of forming 2 or more cationic groups that will form an ionic bond with anions formed from the acid group of the copolymer or complexing with two acid groups. The metal may be one or more of transition metals, post transition metals, metalloids or an alkaline earth metals. The metal may be one or more of zinc, zirconium, aluminum, magnesium and calcium. The metal may be one or more of zinc and/or zirconium. The metal may be zinc. The metal is used in the form of a salt or oxide. Any salt or oxide may be used which can form cations under reaction conditions for the formation of the crosslinked polymers. The metal may be present in the form of a metal carbonate, metal acetate, metal bicarbonate, metal oxide, metal hydroxide, metal carboxylate, metal acetylacetonate, metal salt of a fatty acid or mixtures thereof. Exemplary metal salts or metal oxides include zinc acetate, zinc oxide, zinc carbonate, zinc hydroxide, zinc stearate, zinc citrate, zirconium acetate, zirconium oxide, aluminum acetate, calcium carbonate, calcium stearate and the like. The metal salt or metal oxide may be present in the reactive composition for forming the crosslinked copolymers in the ratios disclosed hereinbefore. The metal salt or metal oxide may be present in the reactive composition is a sufficient amount to form the crosslinked copolymer. The metal salt or metal oxide may be present in a matrix of a polymer of one or more vinylidene aromatic monomers that can be blended with the copolymer. The metal salt or metal oxide may be present in a masterbatch that may include an admixture of other components useful for the final use of the composition. Such masterbatches may comprise fire retardants, nucleating agents, blowing agents, flow promoters, process aids, fibers, fillers, UV stabilizers, antioxidants, thermal stabilizers, colorants, blends of other polymers, and the like.

The one or more copolymers of one or more vinylidene aromatic monomers and one or more unsaturated compounds containing one or more acid groups may be present in the reactive composition in an amount of about 85 weight percent or greater based on the weight or the reactive composition, about 90 weight percent or greater or about 99 weight percent or greater. The one or more copolymers of one or more vinylidene aromatic monomers and one or more unsaturated compounds containing acid groups may be present in the reactive composition in an amount of about 99.9 weight percent or less based on the weight or the reactive composition, about 99.8 weight percent or less or about 99.7 weight percent or less.

Disclosed is a method of preparing crosslinked copolymers of one or more vinylidene aromatic monomers and one or more unsaturated compounds containing one or more acid groups. The method may comprise contacting one or more copolymers of one or more vinylidene aromatic monomers and one or more unsaturated acid groups pendant from the copolymer with one or more metal salts or metal oxides of a metal having a valence of 2 or greater under conditions such that a portion of the chains of the copolymer of one or more vinylidene aromatic monomers and one or more unsaturated acids are crosslinked with other chains of the copolymer of one or more vinylidene aromatic monomers and one or more unsaturated acids by ionic bonding of anions formed from the pendant acid groups with metal cations formed from the metal salts or by complexing with metal oxides. The amounts of the reactants utilized may be those amounts recited herein. The conditions of contacting the reactants are chosen such that crosslinked copolymers are formed.

The reactants may be contacted using any method wherein crosslinked copolymers of one or more vinylidene aromatic monomers and one or more unsaturated compounds containing one or more acid groups are prepared. Exemplary methods include melt blending, extrusion, injection molding, foam extrusion, sheet extrusion, and the like. Exemplary methods include melt blending. The temperature for reacting the reactants is selected such that crosslinked copolymers of one or more vinylidene aromatic monomers and one or more unsaturated compounds containing one or more acid groups are prepared. The reactants may be contacted at a temperature of about 180° C. or greater, or about 200° C. or greater, or about 220° C. or greater. The reactants may be contacted at a temperature of about 260° C. or less, or about 250° C. or less, or about 245° C. or less. The contacting time at the stated temperatures is selected such that crosslinked copolymers of one or more vinylidene aromatic monomers and one or more unsaturated compounds containing one or more acid groups are prepared. The contacting time of the reactants may be about 0.1 minutes or greater, about 0.3 minutes or greater or about 0.5 minutes or greater. The contacting time of the reactants may be about 10 minutes or less, about 5.0 minutes or less or about 3.0 minutes or less. Acids may be generated in the process. Any acids present in the reactor may be removed to drive the reaction to completion. Removal of the acids may be performed by any known method. The reactants may be melt blended in an extruder, mixer, and the like. The final form of the products can be pellets, foam boards, sheets, thermoformed articles, injection molded articles, compression molded articles The crosslinks are reversible. The crosslinks may be reversed before the copolymers are used to facilitate processability. The crosslinks may be reversed by subjecting the crosslinked copolymers to a temperature at which the ionic bonds are broken under shear and/or contacting the composition with excess equivalents of an acid with respect to the crosslinked acid groups such that the crosslinks are reversed. The temperature that the crosslinked copolymer may be exposed to break the crosslinks is any temperature at which the crosslinks are broken or reversed. The copolymers may be exposed to a temperature to break the crosslinks of about 180° C. or greater, or about 190° C. or greater, or about 200° C. or greater. The copolymers may be exposed to a temperature to break the crosslinks at a temperature of about 260° C. or less, or about 255° C. or less, or about 250° C. or less. The copolymers may be exposed to a temperature to break the crosslinks at a temperature of about 240° C. The contacting time at the stated temperatures is selected such that the crosslinks of the copolymers of one or more vinylidene aromatic monomers and one or more unsaturated compounds containing one or more acid groups with metal salts or metal oxides are broken. The contacting time of the reactants may be about 0.1 minutes or greater, about 0.2 minutes or greater or about 0.3 minutes or greater. The contacting time of the reactants may be about 5 minutes or less, about 4 minutes or less or about 3 minutes or less. The contacting may take place under shear. Shear may be induced in an extruder, mixer or injection molding equipment.

Alternatively the crosslinks may be reversed by contacting the crosslinked co-polymer with an acid that causes the crosslinks to break. Exemplary classes of acids include acetic acid, a carboxylic acid corresponding to the formula CH3(CH2)nCOOH wherein n is separately in each occurrence from 1 to 20, triflouro acetic acid, or mixtures thereof. Exemplary acids include acetic acid. Any ratio of acid to the crosslinked copolymer which causes the crosslinks to be broken may be used. The equivalents ratio of acids to the crosslinked anions of the acid groups is about 1:1 or greater, about 5:1 or greater or about 10:1 or greater. The equivalents ratio of acids to the crosslinked anions of the acid groups is about 10000:1 or less, about 5000:1 or less or about 4000:1 or less. The process is performed until the solution viscosity of the copolymer of one or more vinylidene aromatic monomers and one or more unsaturated acids is substantially the same after the crosslinking is reversed as it is before crosslinking. Substantially the same means the solution viscosity of the copolymer that has undergone reversal of crosslinking is within 5 percent of the original molecular weight or within 1 percent of the original molecular weight.

The pellets of the formulated composition may be extruded to form sheets. The sheets may be thermoformed into shaped articles. The formulated compositions may be molded into articles.

ILLUSTRATIVE EMBODIMENTS

The following examples illustrate the invention, but are not intended to limit the scope thereof. All parts and percentages are by weight unless otherwise indicated.

Example 1

Figure 2:
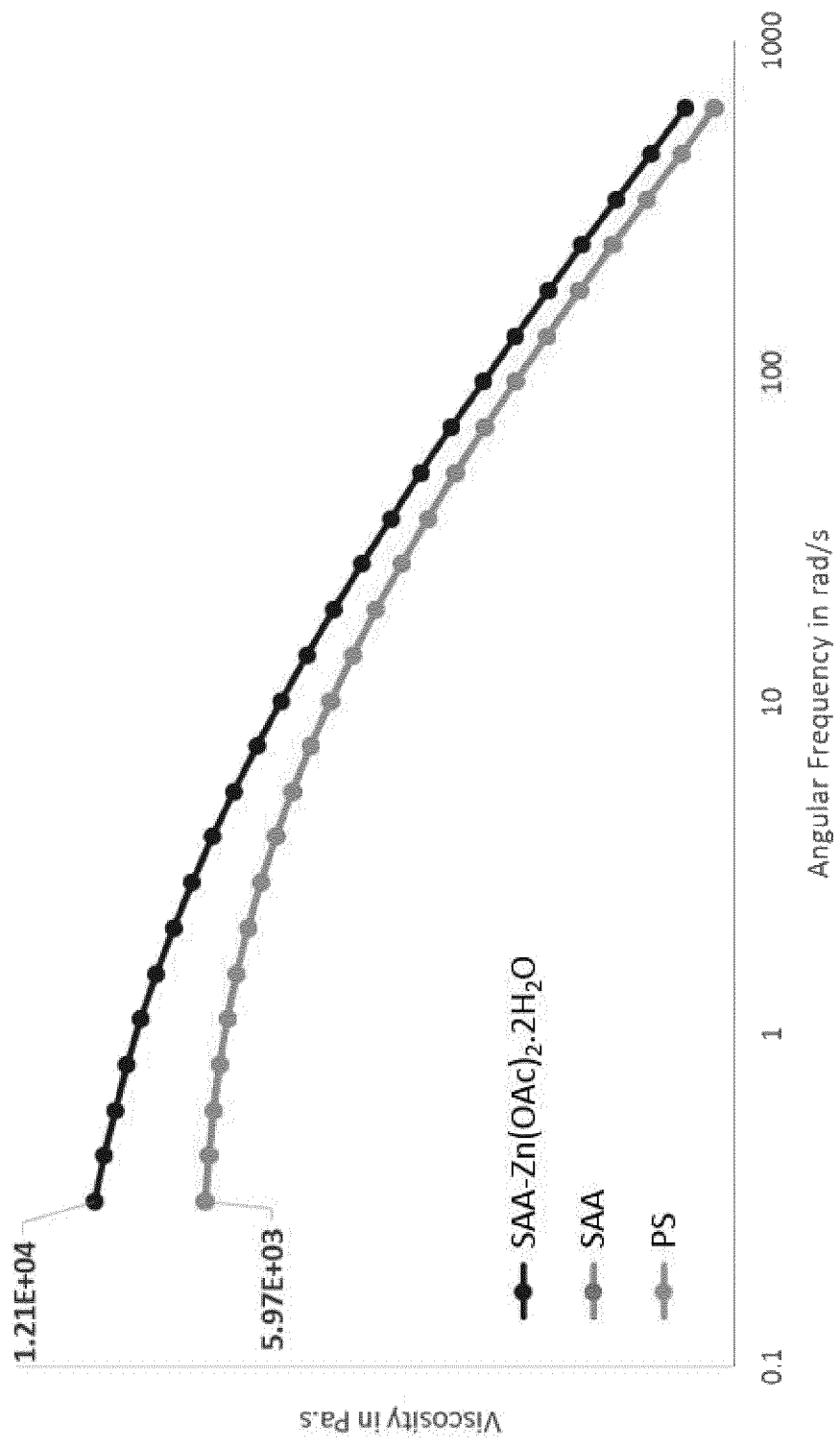
FIG. 2 shows rotational rheology shows significant increase in melt viscosity with SAA-Zn compared to SAA and PS at low shear rates.
Figure 3:
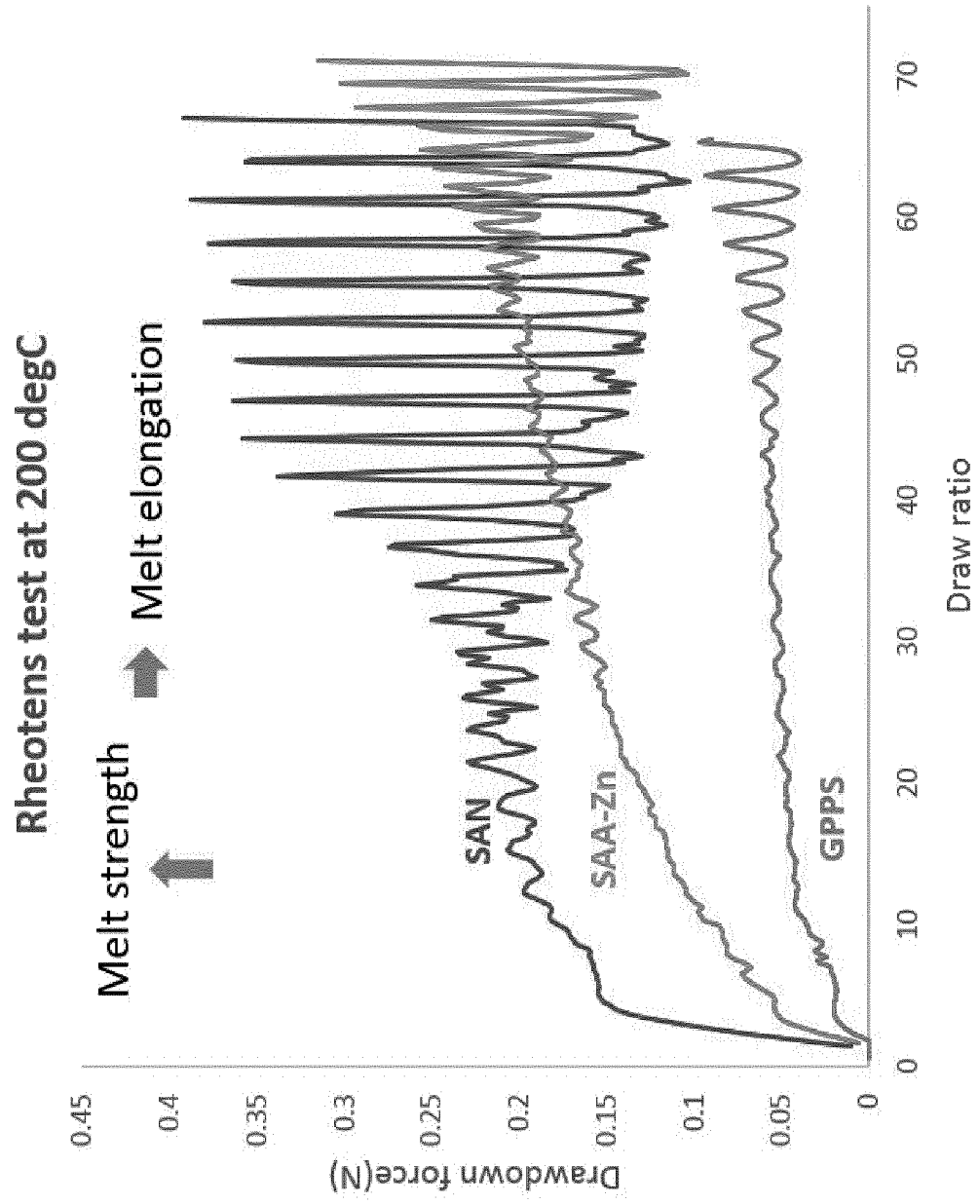
FIG. 3 shows Rheotens curves which show that SAA-Zn has much higher melt strength (y-axis) and melt elongation (x-axis) compared to SAA and PS.

Styrene acrylic acid copolymers are prepared via free radical polymerization in ethyl benzene (EB, 5 wt %) using a chemical initiator (Trigonox 22-E50, Akzo Nobel). These polymers are melt blended with different metal salts such as Zinc acetate (dihydrate or anhydrous) and Zirconium acetate. Acetate exchange between salt and polymer results in ionically crosslinked polymers. The solution viscosities of these polymers are much higher than the same polymers without crosslinking. Addition of excess acetic acid as compared to the crosslinked acids reversed the solution viscosity increase completely which proves that the increase in solution viscosity is caused by reversible ionic bonds. It also shows that acetate exchange takes place readily at room temperature in solution (FIG. 1). FIG. 1 and Table 1 show the solution viscosity of different polymers in toluene. Solution viscosity increases when chains are ionically crosslinked. If acetic acid is added solution viscosity is the same as the polymer without crosslinking which proves the presence of reversible ionic crosslinking. Although ionic crosslinking is known to be thermoreversible, melt viscosity at 200° C. of the polymer increased significantly after ionic crosslinking at low shear rates while processability at high shear rates is maintained (FIG. 2). Rotational rheology in FIG. 2 shows significant increase in melt viscosity with SAA-Zn compared to SAA and PS at low shear rates while maintaining processability at high shear rates. Addition of 1 wt % acrylic acid does not change the melt viscosity of polymer. Zinc crosslinked styrene acrylic acid showed much higher melt strength and melt elongation compared to polystyrene (FIG. 3). Rheotens curves in FIG. 3 show that SAA-Zn has much higher melt strength (y-axis) and melt elongation (x-axis) compared to SAA and PS. Table 1 shows the solution viscosity of a number or materials. Solution viscosity is measured as disclosed herein.

TABLE 1

| Material | Solution viscosity (cSt) | |
|---|---|---|
| | Toluene | THF |
| Polystyrene | 18.0 | 16.7 |
| Copolymer of styrene and acrylic acid | 44.4 | 15.9 |
| Copolymer of styrene and acrylic acid crosslinked by Zn(OAc)2•2H2O | 206.1 | 259.0 |
| SAA-Zn(OAc)$_2$•2H$_2$O + 500 μL acetic acid | | 15.2 |

Example 2

Figure 4:
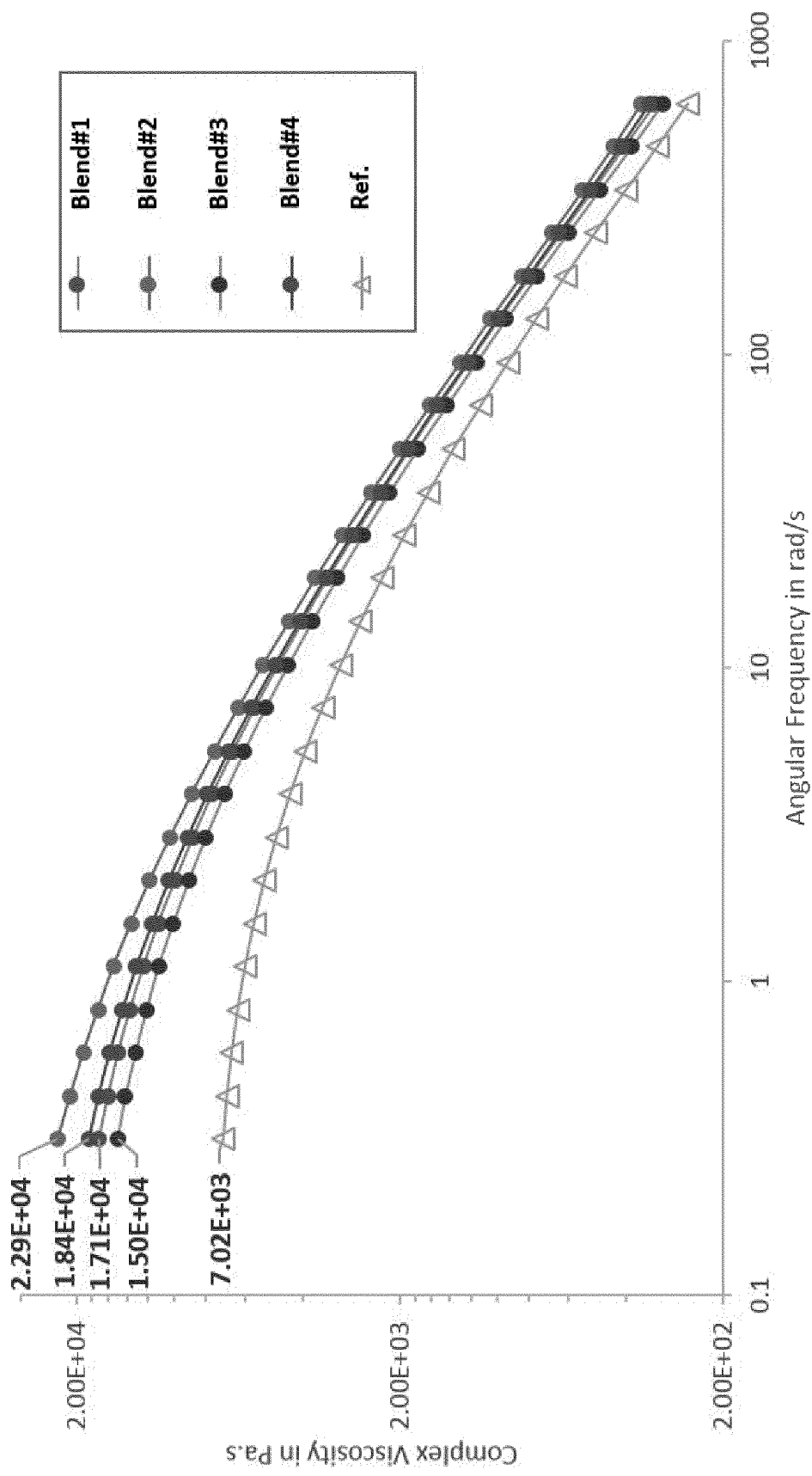
FIG. 4 shows rotational rheology of different SAA-Zn blends prepared under different conditions.

SAA-Zn ionically crosslinked polymers are prepared by melt-blending styrene acrylic acid and Zn(OAc)$_2$. Ionic crosslinks form due to acetate exchange between metal salts and pendant acid groups on polymer. This exchange also leads to formation of acetic acid. Removal of acetic acid from the blend drives the complexation towards ionically crosslinked state. Degree of crosslinking is determined by the melt viscosity of the final polymer. Higher blending temperature and lower throughput (longer residence time) lead to more effective removal of acetic acid therefore to higher degree of ionic crosslinking. The higher the degree of ionic crosslinking the higher the melt viscosity of the resulting polymer at 0.314 s$^{-1}$ angular frequency (FIG. 4). FIG. 4 shows rotational rheology of different SAA-Zn blends prepared under different conditions. Significant increase in melt viscosity is observed at high temperature and long residence time is due to more effective removal of acetic acid. Blends with higher melt viscosity have lower melt-flow-rate under the same conditions (Table 2). GPC shows the same molecular weight for all blends, regardless of the blending conditions, meaning that ionic crosslinks do not survive in GPC and they are completely reversed/broken (Table 2).

TABLE 2

Blending conditions and some properties of SAA-Zn blends prepared under different melt-blending conditions.

| | | Units | Ref. | Blend#1 | Blend#2 | Blend#3 | Blend#4 |
|---|---|---|---|---|---|---|---|
| Blending Parameters | Barrel temp | degC. | | 230 | 230 | 200 | 200 |
| | Throughput | kg/h | | 30 | 10 | 30 | 10 |
| | Screw speed | rpm | | 300 | 300 | 300 | 300 |
| | Melt temp | degC. | | 234 | 242 | — | 218 |
| | Residence time | s | | 21-45 | 44-110 | 21-45 | 44-110 |
| Polymer Properties | Tg | degC. | 105.7 | 106.0 | 106.8 | 106.4 | 106.5 |
| | Mw | g/mol | 196000 | 180400 | 180800 | 182400 | 181800 |
| | Mn | g/mol | 85300 | 75200 | 74200 | 76200 | 75300 |
| | Mz | g/mol | 322700 | 308700 | 313600 | 310800 | 310500 |
| | Mw/Mn | | 2.3 | 2.4 | 2.4 | 2.4 | 2.4 |
| | Area | | 9790 | 9610 | 9490 | 9230 | 9360 |
| | Melt viscosity | Pa·s | 7.0 | 17.1 | 22.9 | 15.0 | 18.4 |
| | MFR | g/10 min | 6.9 | 3.4 | 2.5 | 3.9 | 3.4 |

Example 3

Figure 5:
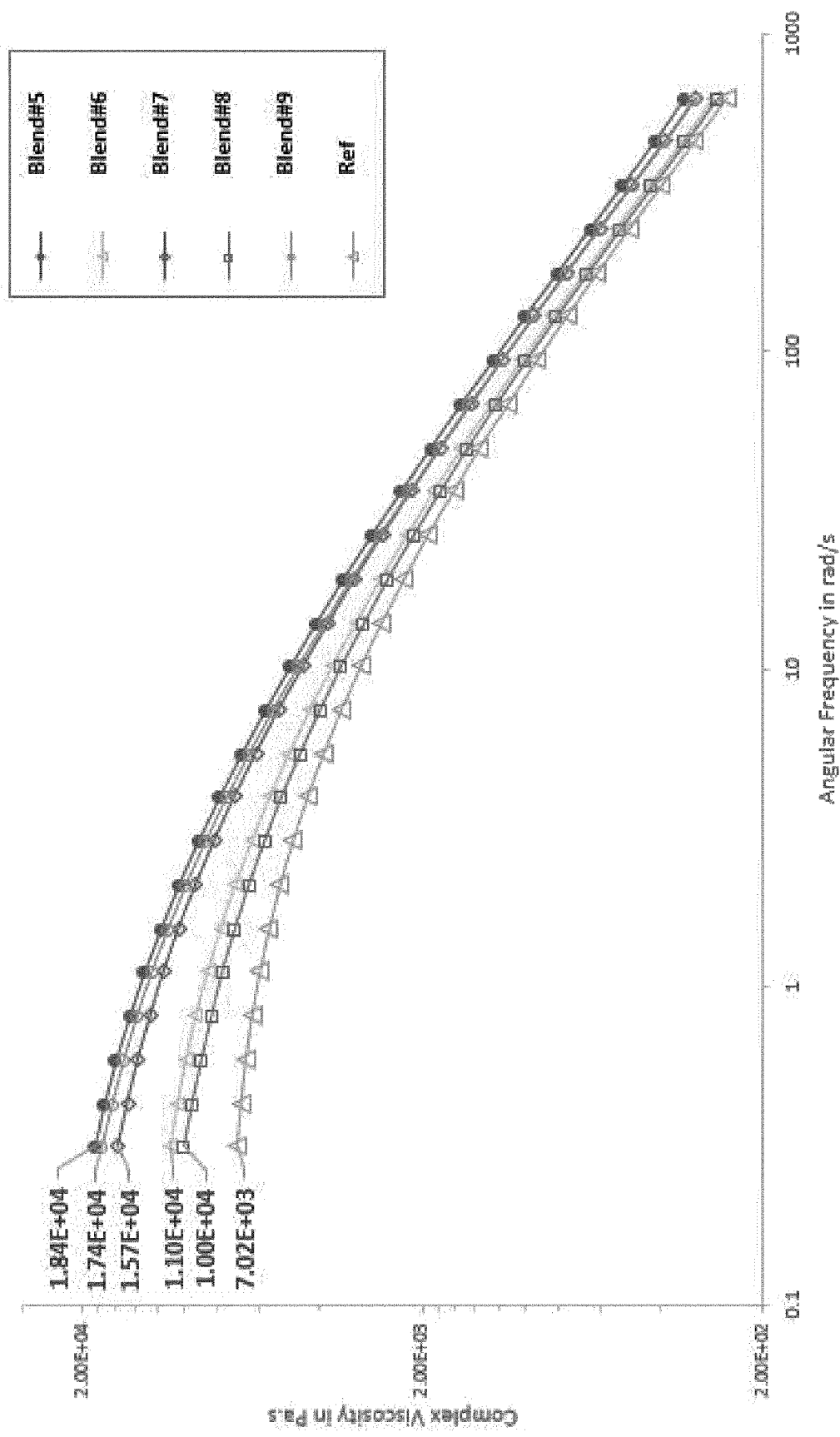
FIG. 5 shows rotational rheology of different styrene acrylic acid blends prepared under different conditions using different Zinc sources.

Influences of the presence of vacuum, addition of metal salt to the blend as master batch or web-blend and using different metal salts as Zinc source are tested under the same temperature (Table 3). Zinc Acetate (anhydrous), Zinc Acetate (dihydrate) and Zinc Carbonate are used as Zinc sources. Ionic crosslinking using different Zinc salts leads to formation of different byproducts which should be removed from the reaction medium. If Zinc Acetate (anhydrous) is used acetic acid is formed, if Zinc Acetate (dihydrate) is used water should also be removed in addition to acetic acid. In the case of Zinc Carbonate, byproduct is carbonic acid which decomposes into carbon dioxide and water at blending temperatures. FIG. 5 shows Rotational rheology of different styrene acrylic acid blends prepared under different conditions using different Zinc sources. Impact resistance of ionically crosslinked polymers are higher than the same polymer without crosslinking. Tensile and flexural properties did not alter significantly compared to impact resistance.

TABLE 3

Mechanical properties of styrene acrylic acid zinc ionically crosslinked polymers

| | | | | PS | SAA | SAA-$Zn(OAc)_2 \cdot 2H_2O$ | SAA-$Zn(OAc)_2$ | SAA-$ZnCO_3$ |
|---|---|---|---|---|---|---|---|---|
| Charpy Impact | unnotched | KJ/m2 | ISO 179 1/1eU | 9 | 9 | 14 | 25 | 15 |
| Izod Impact | unnotched | KJ/m2 | ISO 180/U | 8 | 8 | 11 | 16 | 13 |
| HDT | 1.82 MPa | degC. | ISO 75/A | 82 | 81 | 80 | 83 | 84 |
| Tensile Modulus | | N/mm$^2$ | ISO 527 | 3266 | 3176 | 3301 | 3304 | 3299 |
| Tensile Stress | @break | N/mm$^2$ | ISO 527 | 49 | 49 | 47 | 48 | 44 |
| Flexural Strength | | N/mm$^2$ | ISO 178 | 93 | 93 | 81 | 84 | 78 |
| Flexural Modulus | | N/mm$^2$ | ISO 178 | 3117 | 3184 | 3268 | 3204 | 3134 |
| MFR | 200 degC. | g/10 min | ISO 1622-2 | 7.0 | 6.9 | 4.7 | 2.5 | 4.1 |

Figure 6:
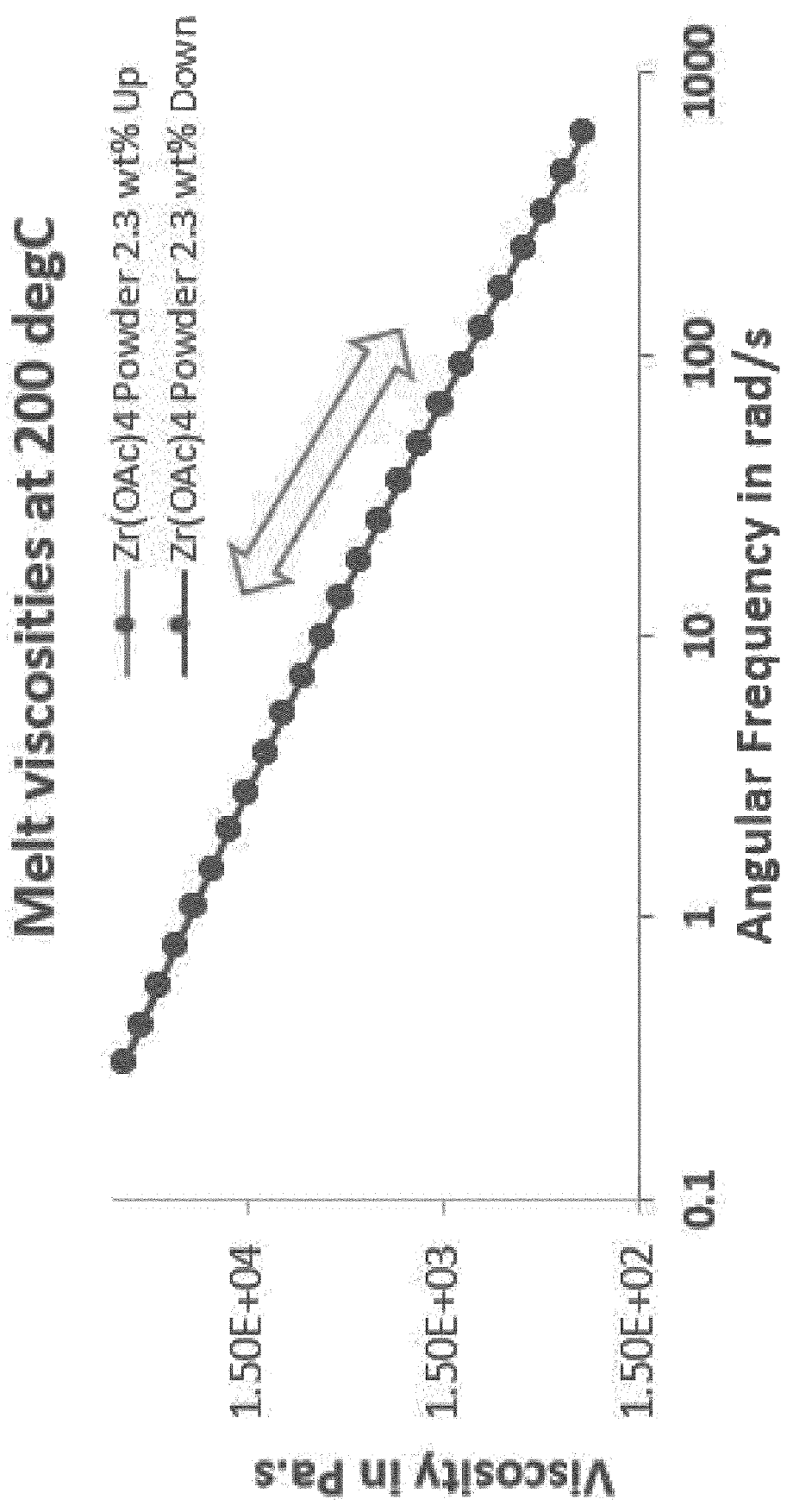
FIG. 6 shows Ionic bonds are reversibly broken at high shear rates and reformed under low shear rates.

Solubility of ionomers in THF is significantly lower compared to the same polymer without crosslinking. However they become completely soluble after acetic acid addition. Acetic acid competes with acrylic acid for bonding to the metal center. If the equivalents of free acetic acid is more than the equivalents of acrylic acid present on the polymer, all ionic bonds are broken. 10 wt % of polymers show significantly lower solubility in THF after ionic crosslinking. Addition of acetic acid breaks all ionic bonds and all polymers become soluble. Ionic bonds are stronger than secondary bonds but weaker than the covalent bonds on polymer backbone. Therefore under shear these ionic bonds are broken selectively. As a result melt viscosity of these ionically crosslinked polymers decreases with increasing shear rates, which increases the processability of the polymer. Melt properties do not alter for the full cycle of high-low-high shear rate test which proves that the ionic bonds are broken at high shear rates and reformed at lower shear rates (FIG. 6). FIG. 6 shows Ionic bonds are reversibly broken at high shear rates and reformed under low shear rates.

TABLE 4

Blending parameters and some properties of SAA-Zn blends prepared under different melt-blending conditions and using different Zinc sources.

|  |  | Units | Blend#5 | Blend#6 | Blend#7 | Blend#8 | Blend#9 |
|---|---|---|---|---|---|---|---|
| Blending Parameters | Barrel temp | degC. | 200 | 200 | 200 | 200 | 200 |
|  | Throughput | kg/h | 10 | 10 | 10 | 10 | 10 |
|  | Screw speed | rpm | 300 | 300 | 300 | 300 | 300 |
|  | Vacuum | Y/N | Y | N | Y | N | Y |
|  | Dosing | MB/WB | MB | MB | WB | MB | WB |
|  | Metal |  | $Zn(OAc)_2$ | $Zn(OAc)_2$ | $Zn(OAc)_2$ | $ZnCO_3$ | $Zn(OAc)_2 \cdot 2H_2O$ |
| Polymer Properties | Tg | degC | 106.5 | 106.2 | 107.6 | 106.5 | 106.9 |
|  | Mw | g/mol | 181800 | 178500 | 189400 | 186100 | 186900 |
|  | Mn | g/mol | 75300 | 73400 | 78500 | 79300 | 76500 |
|  | Mz | g/mol | 310500 | 306400 | 325000 | 309900 | 320500 |
|  | Mw/Mn |  | 2.41 | 2.43 | 2.41 | 2.35 | 2.44 |
|  | Area |  | 9360 |  |  |  |  |
|  | Melt viscosity | Pa · s | 18.4 | 11.0 | 15.7 | 10.0 | 17.4 |
|  | MFR | g/10min | 3.4 | 6 | 3.7 | 5.1 | 2.8 |

Vacuum Y: On N: Off,

Dosing MB: Masterbatch of Zinc salt (20 wt %) in polystyrene WB: web-blend (SAA and Zinc source is mixed at room temperature and dosed together to the extruder) Melt viscosity is measured at 0.314 s-1 angular frequency at 200° C.

What is claimed is:

1. A composition comprising a plurality of chains of one or more copolymers of one or more vinylidene aromatic monomers and one or more unsaturated acids, having a weight average molecular weight of from about 100 kg/mole to about 400 kg/mole, the copolymer having vinylidene aromatic monomers in an amount of about 85 percent by weight of the copolymers or greater and about 0.01 to about 15.0 percent by weight of the one or more unsaturated acids wherein the one or more unsaturated acids are pendant from the copolymer;
wherein a portion of the chains of the copolymer of one or more vinylidene aromatic monomers and one or more unsaturated acids are crosslinked with other chains of the copolymer of one or more vinylidene aromatic monomers and one or more unsaturated acids by i) ionic bonding of anions formed from the one or more pendant unsaturated acids with a cation formed from a metal salt or a metal oxide having a valence of 2 or greater or ii) complexation between pendant acid groups and the metal oxide of the cation having a valence of 2 or greater; the crosslinks are reversible and the weight average molecular weight of the copolymer of one or more vinylidene aromatic monomers and one or more unsaturated acids is substantially the same after the crosslinking is reversed as it is before crosslinking; the melt viscosity at 0.314 $s^{-1}$ angular frequency of the crosslinked copolymer of one or more vinylidene aromatic monomers and one or more unsaturated acids is at least 10 percent higher than the same copolymer without ionic crosslinking when measured at 200° C.; and, wherein the solution viscosity, measured at 23° C. at 10 weight percent in toluene, of the crosslinked copolymer of one or more vinylidene aromatic monomers and one or more unsaturated acids is at least 100 percent greater than the solution viscosity of the copolymer after the crosslinking is reversed.

2. The composition according to claim 1, wherein the metal is one or more of zinc, zirconium, aluminum, magnesium calcium or mixtures thereof.

3. The composition according to claim 1, wherein the copolymer of the one or more vinylidene aromatic monomers and one or more unsaturated acids further comprise one or more (meth)acrylates, unsaturated nitriles or conjugated dienes.

4. The composition according to claim 1, wherein an equivalents ratio of metal cations to equivalents of anions formed from pendant acid groups on the copolymer is from about 40:1 to about 1:40.

5. The composition according to claim 1, wherein the one or more unsaturated acids comprise carboxylic acids, unsaturated aromatic acids, sulfonic acids, phosphorous based acids, boronic acids, or mixtures thereof.

6. The composition according to claim 1, comprising from about 20 to about 99.5 percent by weight of the copolymer and from about 0.5 to about 50 percent by weight of one or more impact modifiers based on the weight of the composition.

7. The composition according to claim 1, wherein the one or more vinylidene aromatic monomers are one or more of styrene, alpha methyl styrene, N-phenyl-maleimide, chlorinated styrenes or mixtures thereof; the one or more unsaturated acids are acrylic acid, methacrylic acid, 4-vinyl benzoic acid, maleic acid, fumaric acid, 4-styrene sulfonic acid, or mixtures thereof; and the metal salt or oxide is a zinc metal salt or oxide.

8. The composition according to claim 7, wherein the one or more unsaturated acids are acrylic acid, methacrylic acid or mixtures thereof.

9. A composition comprising:
a) in one part a plurality of chains of a copolymer of one or more vinylidene aromatic monomers and one or more unsaturated acids having a weight average molecular weight of from about 100 kg/mole to about 400 kg/mole, the copolymer having about 0.01 to about 15.0 percent by weight of the one or more unsaturated acids wherein the one or more unsaturated acids are pendant from the copolymer; and
b) in a separate part one or more metal salts and/or metal oxides of a metal having a valence of 2 or greater; wherein when the one part and the separate part are contacted a portion of the chains of the copolymer of one or more vinylidene aromatic monomers and one or more unsaturated acids are crosslinked with other chains of the copolymer of one or more vinylidene aromatic monomers and one or more unsaturated acids by i) ionic bonding of anions formed from the one or more pendant unsaturated acids with a metal cation having a valence of 2 or greater or ii) complexation between pendant acid groups and metal oxides of the metal cation having a valence of 2 or greater; the crosslinks are reversible and the weight average molecular weight of the copolymer of one or more vinylidene aromatic monomers and one or more unsaturated acids is substantially the same after the crosslinking is reversed as it is before crosslinking; the melt viscosity at 0.314 s$^{-1}$ angular frequency of the crosslinked copolymer of one or more vinylidene aromatic monomers and one or more unsaturated acids is at least 10 percent higher than the same copolymer without ionic crosslinking when measured at 200° C.; and, wherein the solution viscosity, measured at 23° C. at 10 weight percent in toluene, of the crosslinked copolymer of one or more vinylidene aromatic monomers and one or more unsaturated acids is at least 100 percent greater than the solution viscosity of the copolymer after the crosslinking is reversed.

10. The composition of claim 9, wherein an equivalents ratio of metal salts or metal oxides to equivalents of pendant acid groups on the copolymer is from about 40:1 to about 1:40.

11. The composition according to claim 9, wherein the metal is one or more of zinc, zirconium, aluminum, magnesium, calcium or mixtures thereof.

12. The composition according to claim 9, wherein the metal is present as a metal carbonate, metal acetate, metal bicarbonate, metal oxide, metal hydroxide, metal carboxylate, or mixtures thereof.

13. The composition according to claim 9, wherein the copolymer of the one or more vinylidene aromatic monomers and one or more unsaturated acids further comprise one or more (meth)acrylates, unsaturated nitriles or conjugated dienes.

14. The composition according to claim 9, wherein the one or more unsaturated acids comprise carboxylic acids, unsaturated aromatic acids, sulfonic acids, phosphorous based acids, boronic acids, or mixtures thereof.

15. The composition according to claim 9, wherein the copolymer composition comprises from about 20 to about 99.5 percent by weight of the copolymer and from about 0.5 to about 45 percent by weight of one or more impact modifiers based on the weight of the composition.

16. The composition according to claim 9, wherein the separate part, b), may further comprise one or more of polymers comprising vinylidene aromatic monomers having no acid groups, flame retardants, fillers, process aids, mineral oil, nucleating agents, blowing agents, thermal stabilizers, antioxidants, colorants, UV absorbers/stabilizers, thermal attenuators or mixtures thereof.

17. The composition according to claim 9, wherein the one or more vinylidene aromatic monomers are one or more of styrene, alpha methyl styrene, N-phenyl-maleimide, chlorinated styrenes or mixtures thereof; the one or more unsaturated acids are acrylic acid, methacrylic acid, 4-vinyl benzoic acid, maleic acid, fumaric acid, 4-styrene sulfonic acid, or mixtures thereof; and the metal salt or oxide is a zinc metal salt or oxide.

18. A method of preparing a composition according to claim 1, comprising:
contacting one or more copolymers of one or more vinylidene aromatic monomers and one or more unsaturated acids acid groups pendant from the copolymer having a weight average molecular weight of from about 100 kg/mole to about 400 kg/mole, with one or more metal salts or metal oxides of a metal having a valence of 2 or greater under conditions such that a portion of the chains of the copolymer of one or more vinylidene aromatic monomers and one or more unsaturated acids are crosslinked with other chains of the copolymer of one or more vinylidene aromatic monomers and one or more unsaturated acids by ionic bonding of anions formed from the pendant acid groups with metal cations formed from the metal salts or metal oxides; wherein a portion of the chains of the copolymer of one or more vinylidene aromatic monomers and one or more unsaturated acids are crosslinked with other chains of the copolymer of one or more vinylidene aromatic monomers and one or more unsaturated acids by i) ionic bonding of anions formed from the pendant acid groups with a metal cation having a valence of 2 or greater or ii) complexation between pendant acid groups and metal oxides of the metal cation having a valence of 2 or greater; the crosslinks are reversible and the weight average molecular weight of the copolymer of one or more vinylidene aromatic monomers and one or more unsaturated acids is substantially the same after the crosslinking is reversed as it is before crosslinking; the melt viscosity at 0.314 s$^{-1}$ angular frequency of the crosslinked copolymer of one or more vinylidene aromatic monomers and one or more unsaturated acids is at least 10 percent higher than the same copolymer without ionic crosslinking when measured at 200° C.; and, wherein the solution viscosity, measured at 23° C. at 10 weight percent in toluene, of the crosslinked copolymer of one or more vinylidene aromatic monomers and one or more unsaturated acids is at least 100 percent greater than the solution viscosity of the copolymer after the crosslinking is reversed.

19. The method of claim 18, wherein the contacting is at a temperature of about 180° C. to about 250° C. for a time of about 0.5 to about 5 minutes wherein the copolymer of one or more vinylidene aromatic monomers and one or more unsaturated acids are crosslinked with other chains of the copolymer of one or more vinylidene aromatic monomers and one or more unsaturated carboxylic acids by i) ionic bonding of anions formed from the pendant acid groups with a metal cation having a valence of 2 or greater or ii) complexation between pendant acid groups and metal oxides.

20. A method comprising subjecting the composition of claim 1, to a temperature of about 180° C. to about 240° C. under shear and/or contacting the composition with excess equivalents of an acid with respect to the crosslinked anions such that the crosslinks are reversed.

* * * * *